United States Patent [19]

Brandt et al.

[11] 4,409,636

[45] Oct. 11, 1983

[54] DEVICE FOR DETECTING FAULTY PHASES IN A MULTI-PHASE ELECTRICAL NETWORK

[75] Inventors: Nils Brandt; Torbjörn Einarsson, both of Västerås, Sweden

[73] Assignee: Asea Aktiebolag, Västerås, Sweden

[21] Appl. No.: 327,454

[22] Filed: Dec. 4, 1981

[30] Foreign Application Priority Data

Dec. 5, 1980 [SE] Sweden .............................. 8008576

[51] Int. Cl.³ .............................................. H02H 3/26
[52] U.S. Cl. ....................................... 361/87; 361/93; 361/113
[58] Field of Search .................... 361/82, 87, 111, 93, 361/113

[56] References Cited

U.S. PATENT DOCUMENTS 3,699,431 10/1972 Paddison et al. ................ 361/87 X
3,878,460 4/1975 Nimmersjo ....................... 361/82 X
3,956,671 5/1976 Nimmersjo ........................... 361/111

Primary Examiner—Harry E. Moose, Jr.
Attorney, Agent, or Firm—Watson, Cole, Grindle & Watson

[57] ABSTRACT

The present invention relates to a protection device for detecting at least one faulty phase in an electrical network. The device comprises a band exclusion filter for each phase for filtering away the signals which have the same frequency as the nominal frequency of the network, amplifiers, rectifiers and peak value forming means for each phase. In addition, the different phase signals are fed to a function element which delivers a signal to a level and comparison device for each phase, where the signal is compared with the signals in the respective phase.

13 Claims, 1 Drawing Figure

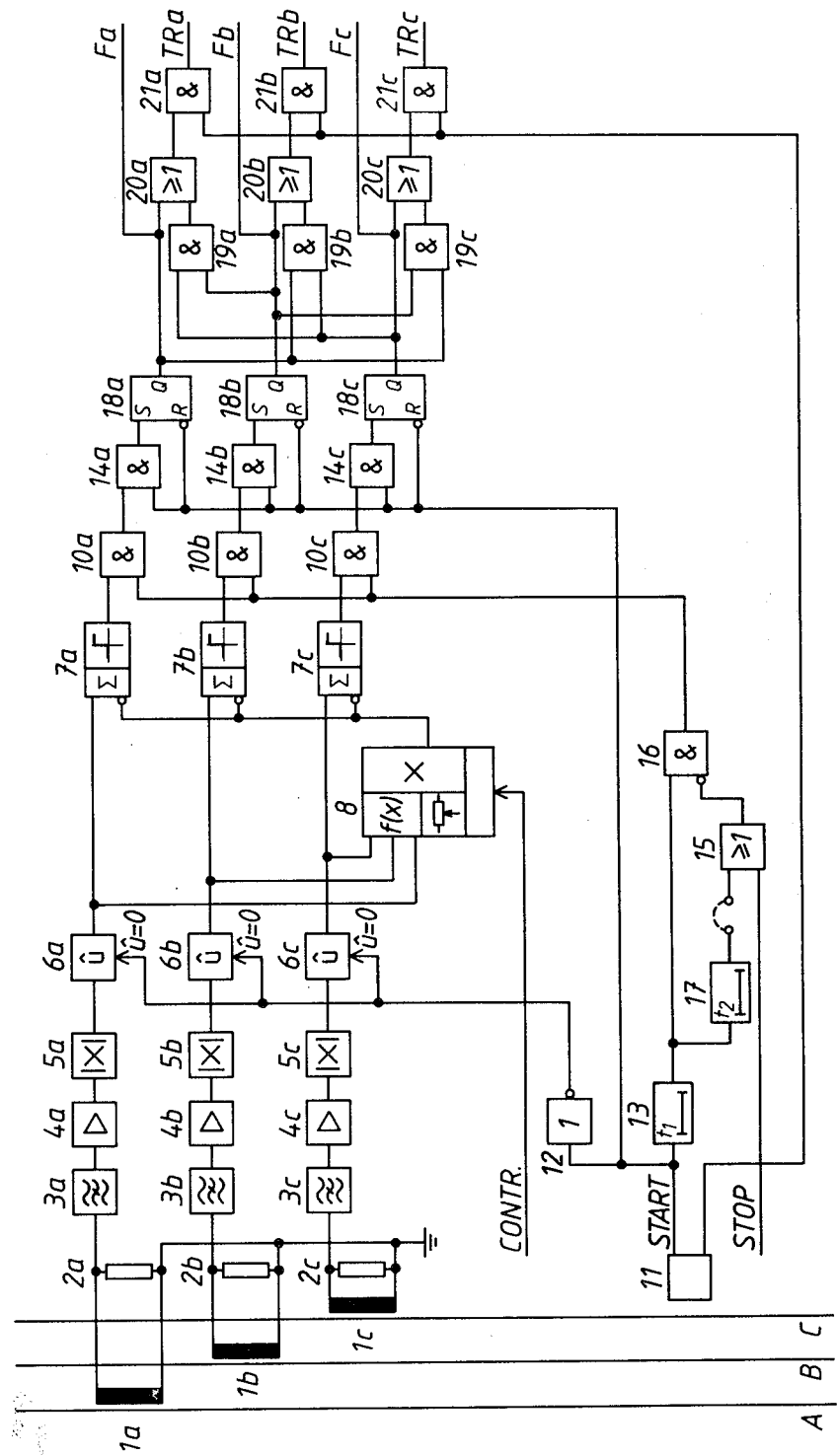

DEVICE FOR DETECTING FAULTY PHASES IN A MULTI-PHASE ELECTRICAL NETWORK

TECHNICAL FIELD

The present invention relates to a device for detecting a faulty phase or faulty phases in a multi-phase electrical network, in which a band exclusion filter is connected to each phase for filtering away the part of a first signal which has the same frequency as the nominal operating frequency of the network. The device is provided with two outputs for each phase, one for indicating whether or not there is a fault in that phase, and one for providing a tripping signal for a circuit-breaker in that phase.

DISCUSSION OF PRIOR ART

To achieve correct operation of a protective relay for a multi-phase network, it is necessary to be able to determine which is the faulty phase; otherwise a faulty tripping may be obtained, which in many cases must not occur since the consequential operational disturbances may be very considerable.

With the solution known up to now, measurement has been performed only in each individual phase (of e.g. U.S. Pat. No. 3,956,671). However, with this known device problems may arise in the case of a network which is supplied from two sides, since a fault in one phase can affect the currents in the other phases as well. This may result in indication of faults in faultless phases and, worse, in an unnecessary three-phase tripping of the network when there was a fault in only one phase.

STATEMENT OF INVENTION

The present invention aims to provide a solution to the above-mentioned problems and other problems associated therewith, and is characterised in that a rectifying unit and a peak value forming unit are connected to each band exclusion filter, and that the output signals from the peak value forming unit in all phases of the network are adapted to be supplied to a function element for delivering a reference signal to a level and comparison element for each phase, in which the signal is compared with the signal which is rectified for each phase and the peak value of which is formed for each phase, and that the output signal from the level and comparison element controls the output signals from the device.

By using a phase-selecting system according to the invention, a considerably more reliable protection device is obtained, since the amplitudes of the signals in each individual phase are compared with a reference signal which is dependent on the signals in all the phases of the network. A suitable function for obtaining the first reference signal is to take a certain percentage, for example 40-60%, of the signal in the three phases which has the highest amplitude.

If the function element is supplied with a second, external control signal, it is possible, for example, to change the characteristic of the function generator, thus obtaining a variable function depending on this external signal.

By using a starting signal, for example an output signal from a wave detector according to U.S. Pat. No. 3,878,460, the effect is obtained that a measurement is carried out only when a disturbance appears in the network.

In order that the phase indications, which are derived from the fault, will not be changed upon disconnection of the line, the sensing may be stopped either after a certain period of time or via an external signal on a STOP input, for example a delayed signal from a wave detector. If the starting signal is a pulse, the length of that pulse will determine the duration of the measurement.

BRIEF DESCRIPTION OF DRAWING

The invention will be described in greater detail, by way of example, with reference to the accompanying schematic drawing which shows one possible embodiment of device according to the invention.

DESCRIPTION OF PREFERRED EMBODIMENT

The drawing shows a three-phase embodiment of device, in which the three phases of a network to be protected are designated A, B and C, and each phase includes a current transformer 1a, 1b and 1c, respectively. The device is constructed in the same way for all three phases and in the following, only phase A will be described in detail. The corresponding components for the B and C phases are indicated with a b or c after the numeral. A resistance 2a is connected across the current transformer 1a to provide a voltage signal proportional to the current flowing in the phase A. This voltage signal is fed to a band exclusion filter 3a where the component of the signal having the same frequency as the nominal operating frequency of the network is filtered out. Next, the filtered signal is amplified in an amplifier 4a, to obtain a suitable signal level, and the amplified signal is supplied to an absolute value forming rectifying circuit 5a. The signal, thus rectified, is then supplied to a peak value sensing circuit 6a, which is provided with an external means for setting the signal to zero.

The peak value signal is then supplied both to the noninverted input of a summation and level detecting circuit 7a and to a function element 8, common to all three phases, which in a suitable manner combines the three input signals into a single reference signal. This may, for example as previously mentioned, consist of a certain percentage of the signal appearing in the three phases which has the highest amplitude, or, for example, consist of a certain part of the weighted sums or differences between two or three of the signals in the three phases of the network. The factor which distinguishes the reference signal from the signal in the phases may be obtained, for example, by voltage division or via a multiplier. This factor may also be changed during operation of the device by means of an external control input CONTR. The absolute magnitude of the output signal from the function element 8 must, in this embodiment of the invention, be lower than the absolute magnitude of the greatest one of the signals appearing on the outputs from the peak value sensing circuits 6a, 6b or 6c.

The output signal from the function element 8 is supplied to the inverted input of the above-mentioned summation and level detecting circuit 7a. The output signal from the circuit 7a is supplied, in its turn, to one input of an AND gate 10a. The output signals from the circuits 7 thus indicate if and in what phases the changes in the currents have exceeded the value obtained from the function element 8.

To determine when a measurement is to commence, the output signal from a travelling wave detector 11 monitoring the network is employed. If a one-signal is obtained at the output from the wave detector 11, this signal passes via an inverting means 12 to the peak value sensing circuit 6a, and causes its neutral position to be cancelled. In addition, after a certain time $t_1$, determined by a time-delayed pick-up element 13, a signal is fed to the other input of the AND gate 10a. The output signal from this AND-gate is then supplied to the input of another AND gate 14a. The above-mentioned time-delayed signal may be inhibited in two ways. One way is to cause the signal from the wave detector 11 to disappear. Another way is to supply a one-signal at the lower inverted input of an AND gate 16. This means that an OR gate 15 must provide a one-signal at its output, and to obtain this it is required either that an external stop signal is supplied to one of the inputs of the OR gate 15, or that a one-signal is obtained via a time-delayed pick-up element 17 with the time delay $t_2$ (so that the one-signal from the element 17 lags behind the starting signal from the wave detector 11 by the time $t_1+t_2$). The starting signal is also supplied to a second input of the AND gate 14a, and to an inverted reset input on an SR flip-flop 18a. This means that when a one-signal on the reset input is obtained, the SR flip-flop 18a is ready to be set if an output signal is obtained from the AND gate 10a. The output signals from the SR flip-flops 18a, b, c indicate in which phase or phases a fault has occurred.

Only single-phase or three-phase tripping is to be allowed. In order to achieve this, AND gates 19a, b, c and OR gates 20a, b, c are used in accordance with a known method (U.S. Pat. No. 3,956,671). The output signal from the OR gate 20a is supplied to an AND gate 21a, the second input of which is supplied with the output signal from the wave detector 11. The purpose of the AND gate 21a is to coordinate the wave detector and the device according to the present invention so that both these units sense a fault. Thus, an output signal TRa from the AND gate 21a is a tripping signal which controls a circuit-breaker which is arranged in the phase in question. The output signal from the SR flip-flop 18a provides a second output signal Fa from the unit, which indicates whether or not there is a fault in the phase in question. The signal Fa can then control some form of memory in order to store the information as to in what phase or phases a fault occurred.

When the power supply network is undisturbed, the different phases substantially only contain currents of the fundamental frequency, which means that the output signal from the filters 3a to 3c is zero. In addition, the starting signal from the wave detector 11 will be zero, and therefore the peak value sensing circuits 6a to 6c are set to zero and the SR flip-flops 18a to 18c are set to zero at the output. Therefore, the two output signals F and TR for each phase are also zero.

When a fault occurs in the network, an output signal is obtained from the filters 3 and a one-signal is obtained from the wave detector 11. This one-signal causes the peak value sensing circuits to be released (so that sensing of the filtered, amplified and rectifier signals which correspond to the change in the respective phase currents can commence), and it also causes the SR flip-flops to be released. In addition to this, the level detecting circuits 7a to 7c start comparing the output signals from the circuits 6a to 6c (which are proportional to the current changes), phase by phase with the signal which is obtained from the function element 8. After a certain stabilizing period $t_1$, the output signals of the level detecting circuit in the respective phase are then allowed to set the respective SR flip-flop 18a, 18b or 18c. The F outputs then indicate in which phase or phases the changes in the currents have exceeded the value specified according to the function element 8, and thus in which phase or phases a fault has occurred. To prevent this phase indication being affected when one or more phases are disconnected, the sensing is interrupted either after a certain time or by means of an externally supplied stop signal.

The above description of one preferred embodiment, of the invention may be modified in a number of ways, within the scope of the following claims, while using known or future electronic equipment.

What is claimed is:

1. A device for detecting at least one faulty phase in a multi-phase electrical network comprising,
   a band exclusion filter connected to each phase of the network for filtering off the part of a received signal which has the same frequency as the nominal operating frequency of the network, said signal being proportional to the current which flows through the phase,
   a first output for each phase for indicating whether or not there is a fault in that phase,
   a second output of the device for each phase for a tripping signal for supply to a circuit breaker in that phase,
   a rectifying unit,
   a unit for determining the peak value of the output from the rectifier unit, both said rectifying unit and said peak value determining unit being connected to each said band exclusion filter,
   a function element to receive the output signals from the peak value forming units in all the phases and to produce an output signal which represents a percentage of the phase signal whose amplitude is highest,
   a level and comparison device for each phase, in which the output signal from the function element is compared with the rectified peak value for each phase, and
   means to control the generation of signals for said first and second outputs of the device from the output signal from the respective level and comparison device.

2. A device according to claim 1 in which the function element includes an input for an external control signal which is capable of changing the function of the function element.

3. A device according to claim 1 further comprising means to receive an external stop signal adapted to terminate the measurement after a certain period of time.

4. A device according to claim 1 wherein the function element consists of a peak value forming unit and a multiplier.

5. A device according to claim 1, further comprising means to generate a starting signal which starts the measurement operation when a disturbance is sensed in the network.

6. A device according to claim 5 in which the function element includes an input for an external control signal which is capable of changing the function of the function element.

7. A device according to claim 5 further comprising means to receive an external stop signal adapted to terminate the measurement after a certain period of time.

8. A device according to claim 5 wherein the function element consists of a peak value forming unit and a multiplier.

9. A device according to claim 5, in which said starting signal generating means comprises a travelling wave detector coupled to the network.

10. A device according to claim 9 in which the function element includes an input for an external control signal which is capable of changing the function of the function element.

11. A device according to claim 9 further comprising means to receive an external stop signal adapted to terminate the measurement after a certain period of time.

12. A device according to claim 9 wherein the function element consists of a peak value forming unit and a multiplier.

13. A device for detecting at least one faulty phase in a multi-phase electrical network comprising,
- a band exclusion filter connected to each phase of the network for filtering off the part of a received signal which has the same frequency as the nominal operating frequency of the network, said signal being proportional to the current which flows through the phase,
- a first output of the device for each phase for indicating whether or not there is a fault in that phase,
- a second output of the device for each phase for a tripping signal for supply to a circuit breaker in that phase,
- a rectifying unit and a unit for determining the peak value of the output from the rectifier unit connected to each said band exclusion filter,
- a function element to receive the output signals from the peak value forming units in all the phases and to produce an output signal which is a proportion of the weighted sum or difference between at least two of the phase signals,
- a level and comparison device for each phase, in which the output signal from the function element is compared with the rectified peak value for each phase, and
- means to control the generation of signals for said first and second outputs of the device from the output signal from the respective level and comparison device.

* * * * *